US009652630B2

(12) United States Patent
Padmanabhan et al.

(10) Patent No.: US 9,652,630 B2
(45) Date of Patent: *May 16, 2017

(54) ENHANCED VIEW COMPLIANCE TOOL

(71) Applicant: Bank of America Corporation, Charlotte, NC (US)

(72) Inventors: Bharani Shangar Padmanabhan, Concord, CA (US); Vidhya Lakshmi, Chennai (IN); AnnCharlot H. Harvey, Iron Station, NC (US); Debra O'Leary, Martinez, CA (US); Nithyabala Narasingan, Concord, CA (US); Saravanan Chinthamani, Tuticorin District (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,799

(22) Filed: Jan. 5, 2016

(65) Prior Publication Data
US 2016/0117524 A1 Apr. 28, 2016

Related U.S. Application Data

(63) Continuation of application No. 14/040,984, filed on Sep. 30, 2013, now Pat. No. 9,275,252.

(51) Int. Cl.
*G06F 17/30* (2006.01)
*G06F 21/62* (2013.01)

(52) U.S. Cl.
CPC .... *G06F 21/6245* (2013.01); *G06F 17/30383* (2013.01); *G06F 21/6227* (2013.01)

(58) Field of Classification Search
CPC ................................................ G06F 17/30383
See application file for complete search history.

(56) References Cited

U.S. PATENT DOCUMENTS

| 6,253,203 | B1 | 6/2001 | O'Flaherty et al. |
| 8,078,595 | B2 * | 12/2011 | King ................... G06F 21/6227 707/694 |
| 8,826,370 | B2 * | 9/2014 | Boukobza ........... G06F 21/6227 726/1 |
| 2002/0095405 | A1 | 7/2002 | Fujiwara |

(Continued)

*Primary Examiner* — Khanh Pham
(74) *Attorney, Agent, or Firm* — Michael A. Springs

(57) ABSTRACT

An apparatus comprises a network interface and a processor communicatively coupled to the network interface. The network interface communicates with a database comprising a plurality of columns and a plurality of views. Each view is associated with at least one column of the plurality of columns. The processor receives a request to determine one or more noncompliant views of the database. For each view and each column associated with the view, the processor determines whether the column is associated with a privacy indicator that indicates that the column should be masked and whether the view masks the column. The processor then determines that the view is noncompliant if the view does not mask at least one column that should be masked, and generates a report that indicates whether each view of the database is noncompliant. The network interface communicates the report.

12 Claims, 5 Drawing Sheets

(56) References Cited

U.S. PATENT DOCUMENTS

| | | | |
|---|---|---|---|
| 2005/0144176 A1* | 6/2005 | Lei | G06F 17/30427 |
| | | | 707/999.1 |
| 2010/0042643 A1 | 2/2010 | Pattabhi et al. | |
| 2011/0313981 A1* | 12/2011 | Ben-Natan | G06F 21/6227 |
| | | | 707/694 |
| 2012/0197919 A1 | 8/2012 | Chen et al. | |
| 2013/0036110 A1 | 2/2013 | Scott et al. | |

* cited by examiner

400

V2 Report

| Columns | Private? | Masked? |
|---|---|---|
| Social Security Number | Yes | Yes |
| Income | Yes | No |

FIG. 4

ENHANCED VIEW COMPLIANCE TOOL

RELATED APPLICATION

This application is a continuation of pending U.S. patent application Ser. No. 14/040,984 filed Sep. 30, 2013.

TECHNICAL FIELD

This disclosure relates generally to database management.

BACKGROUND

As the world becomes increasingly digital and interconnected, the amount of information stored in databases increases. If access to a database is not managed appropriately, sensitive information may be leaked to individuals who should not see that information.

SUMMARY OF THE DISCLOSURE

According to one embodiment, an apparatus may comprise a network interface and a processor communicatively coupled to the network interface. The network interface may communicate with a database comprising a plurality of columns and a plurality of views. Each view is associated with at least one column of the plurality of columns. The processor may receive a request to determine one or more noncompliant views of the database. In response to receiving the request, for each view of the plurality of views, for each column associated with the view, the processor may determine whether the column is associated with a privacy indicator that indicates that the column should be masked. Then, for each column associated with the view, the processor may determine whether the view masks the column. The processor may then determine that the view is noncompliant if the view does not mask at least one column associated with the view. The at least one column is further associated with at least one privacy indicator that indicates that the at least one column should be masked. The processor may then generate a report that indicates whether each view of the database is noncompliant. The network interface may communicate the report to a sender of the request.

According to another embodiment, an apparatus may comprise a memory and processor communicatively coupled to the memory. The memory may store instructions. The processor may, when the instructions are executed, communicate a request to determine one or more noncompliant views of a database. The database may include a plurality of columns and a plurality of views. Each column is associated with a privacy indicator, and each view is associated with at least one column of the plurality of columns. The processor may further receive, in response to the request, a report that indicates whether each view of the database is noncompliant. For each column associated with the view, whether there is a privacy indicator associated with the view that indicates that the view should be masked is determined. For each column associated with the view, whether the view masks the column is determined. A view is noncompliant if the view does not mask at least one column associated with the view, wherein the at least one column is further associated with at least one privacy indicator that indicates the at least one column should be masked.

Certain embodiments may provide one or more technical advantages. A technical advantage of one embodiment includes enhancing database compliance by automating the process of reviewing view compliance. Yet another technical advantage of an embodiment includes reducing the amount of network traffic caused by view compliance reviews. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIG. 4 illustrates a sub-report of the report of the system of FIG. 1.

DETAILED DESCRIPTION

Embodiments of the present disclosure and its advantages are best understood by referring to FIGS. 1 through 5 of the drawings, like numerals being used for like and corresponding parts of the various drawings.

This disclosure describes a system for reviewing database compliance. As the world becomes increasingly digital and interconnected, databases are used to store increasing amounts of sensitive and/or private information. Access to this information becomes more difficult to manage as the amount of sensitive information increases. The disclosed system may make managing access to this information easier and more efficient.

Databases store information in tables. The tables may include columns of information. For example, a database may store names and contact information in a table. The table may include a column for the names and a column for the corresponding contact information. In order to provide a user access to this information, a view may be created. The view may be mapped to particular tables and/or columns in the database. The view may also be stored in the database. The view may further be assigned to a particular user or a particular group of users in order to allow those users to access information stored in the database.

The views may also be configured to mask particular information within a table. In some instances a table may include a column with confidential information that a particular group of users should not see. A view that is assigned to this group of users and also mapped to this table may be configured to mask the column of confidential information. For example, a table may include a column of names and a column of incomes corresponding to those names. A view mapped to this table may be assigned to a group of employees. However, these employees should be given access to the names but not the incomes corresponding to those names. As a result, the view may be configured to mask the column of incomes from the group of employees. When an employee from the group of employees uses the view, the employee will not see the incomes corresponding to the names stored in the table.

Views are sometimes generated with improper masks. If a user or group of users assigned to these views uses these views, the user or group of users will be able to see information that should not be seen. The disclosed system may examine each view stored in a database and determine whether the view is compliant or noncompliant. If a particular view provides access to information that a user or group of users should not be able to access, then the system may determine that that view is noncompliant.

After the system determines whether each view in the database is compliant or noncompliant, the system may generate a report that indicates which views are compliant and which views are noncompliant. The system may communicate the report to an administrator so that noncompliant views may be remedied.

Figure 1:
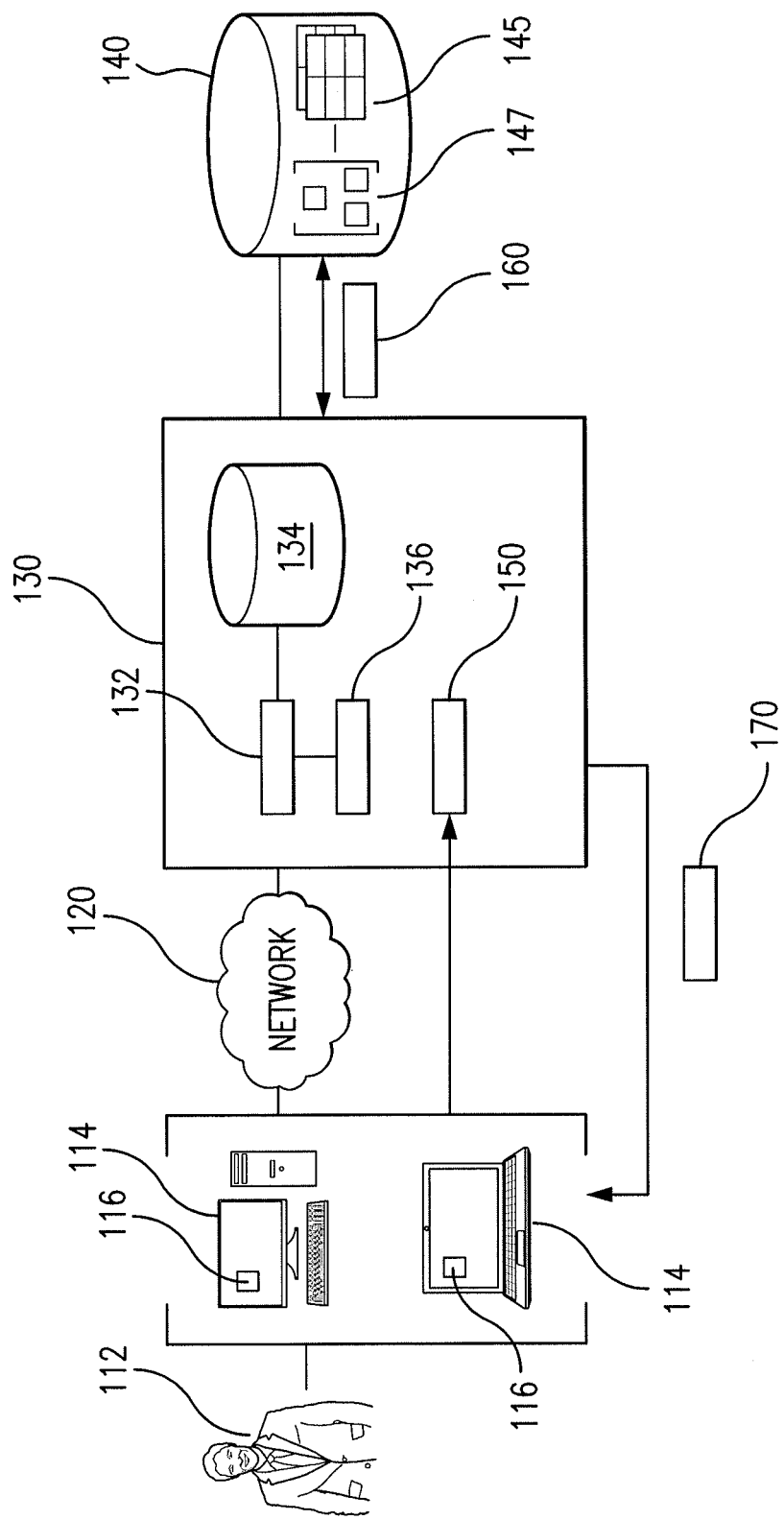
FIG. 1 illustrates a system for reviewing view compliance.

FIG. 1 illustrates a system 100 for reviewing view compliance. As provided by FIG. 1, system 100 includes a device 114, a network 120, a processing module 130, and a database 140. Device 114 may be communicatively coupled to processing module 130 through network 120. Processing module 130 may be communicatively coupled to database 140. In particular embodiments, processing module 130 may be communicatively coupled to database 140 through network 120. A user 112 may use system 100 to determine whether the views of database 140 are compliant.

User 112 may use a device 114 to interact with system 100. For example, user 112 may use device 114 to initiate compliance reviews of database 140. As another example, user 112 may use device 114 to review reports indicating which views of database 140 are noncompliant.

Device 114 may be a mobile device such as a cell phone or tablet. Device 114 may be a personal computer, a workstation, a laptop, a wireless or cellular telephone, an electronic notebook, a personal digital assistant, a tablet, or any other device (wireless, wireline, or otherwise) capable of receiving, processing, storing, and/or communicating information with other components of system 100. Device 114 may also include a user interface, such as a display, a touchscreen, a microphone, keypad, or other appropriate terminal equipment usable by user 112.

Device 114 may include various components including: a processor, a memory, a network interface, and a display. The functions described herein may be performed by these components of device 114. The memory of device 114 may store an application 116 that may be executed by the processor of device 114. Application 116 may include software instructions. When executed, application 116 may allow user 112 to interact with device 114 in order to perform the functions described herein. For example, application 116 may cause device 114 to communicate a request 150, via the network interface of device 114, to determine the noncompliant views 147 of database 140. As another example, application 116 may present a report 170 on the display of device 114 after device 114 receives report 170. Report 170 may indicate the views 147 of database 140 that are noncompliant. By viewing report 170 on device 114, user 112 may be informed of the views 147 of database 140 that are noncompliant, compliant, and/or excluded.

Network 120 facilitates communications between device 114 and processing module 130. This disclosure contemplates any suitable network 120 operable to facilitate communications between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. This disclosure contemplates end networks having one or more of the described properties of network 120.

Database 140 may store tables 145. Tables 145 may contain columns of information. As an example, a table 145 may include a column of names and a column of addresses corresponding to those names. The tables 145 of database 140 may be associated with views 147. Views 147 may be further associated with one or more users who access the information stored in tables 145. Views 147 may be mapped to tables 145 and/or particular columns in tables 145.

Particular columns of tables 145 may contain confidential, private, and/or sensitive information that should not be seen by one or more users associated with views 147. In particular embodiments, database 140 may include privacy indicators that indicate which columns of tables 145 contain such information. Views 147 may be configured to mask information that a privacy indicator indicates is private, confidential, and/or sensitive. When a view 147 masks information, the one or more users associated with that view 147 will not see that information when the one or more users uses the view 147 to access information stored in database 140.

In some instances, a view 147 may be configured inappropriately and may not mask information that should be masked. Processing module 130 may determine that this view is noncompliant during a compliance review.

Processing module 130 may perform various functions in order to evaluate the compliance of views 147 of database 140 and to report the results of those evaluations to device 114. Processing module 130 represents any suitable component that subscribes user 112 to particular types of information, predicts information, determines offers for clients, schedules tasks, contextualizes information based on location, and offers portions of deals to other lenders. Processing module 130 may include a network server, any suitable remote server, a mainframe, a host computer, a workstation, a web server, a personal computer, a file server, or any other suitable device operable to communicate with device 114. In some embodiments, processing module 130 may execute any suitable operating system such as IBM's zSeries/Operating System (z/OS), MS-DOS, PC-DOS, MAC-OS, WINDOWS, UNIX, OpenVMS, or any other appropriate operating system, including future operating systems. The functions of processing module 130 may be performed by any suitable combination of one or more servers or other components at one or more locations. In the embodiment where processing module 130 is a server, the server may be a private server, or the server may be a virtual or physical server. The server may include one or more servers at the same or remote locations. Also, processing module 130 may include any suitable component that functions as a server. Processing module 130 may include a processor 132, a memory 134, and a network interface 136. Network interface 136 and memory 134 may be communicatively coupled to processor 132. Processor 132, memory 134, and network interface 136 may perform the functions described herein. For example, processor 132 may evaluate whether particular views 147 of database 140 are compliant or noncompliant and network interface 136 may report the results of those evaluations to device 114.

Memory 134 may store, either permanently or temporarily, data, operational software, or other information for processor 132. Memory 134 may include any one or a combination of volatile or non-volatile local or remote devices suitable for storing information. For example, memory 134 may include random access memory (RAM), read only memory (ROM), magnetic storage devices, optical storage devices, or any other suitable information storage device or a combination of these devices.

Processor 132 may control the operation and administration of processing module 130 by processing information received from network 120 and memory 134. Processor 132 may include any hardware and/or software that operates to control and process information. Processor 132 may be a programmable logic device, a microcontroller, a microprocessor, any suitable processing device, or any suitable combination of the preceding.

Network interface 136 represents any suitable device operable to receive information from network 120, transmit information through network 120, perform processing of information, communicate with other devices, or any combination of the preceding. For example, network interface 136 may receive user interactions from device 114. As another example, network interface 136 may communicate messages to device 114. Network interface 136 represents any port or connection, real or virtual, including any suitable hardware and/or software, including protocol conversion and data processing capabilities, to communicate through a LAN, WAN, or other communication system that allows processing module 130 to exchange information with device 114, network 120, or other components of system 100.

Processing module 130 may receive a request 150 from device 114 to determine whether the views 147 of database 140 are compliant. Processing module 130 may initiate a compliance review in response to receiving request 150. Request 150 may be a database level request or a view level request. Processing module 130 may determine whether request 150 is a database level request or a view level request before initiating the compliance review. In particular embodiments, the compliance review may differ based on whether request 150 is a database level request or a view level request. For example, if request 150 is a database level request, processing module 130 may initiate a compliance review of each view 147 of database 140. If request 150 is a view level request, processing module 130 may initiate a compliance review of the views 147 specified in request 150. To send a view level request, user 112 may specify on device 114 the particular views 147 of database 140 that user 112 wishes to be reviewed. To initiate a database level request, user 112 may specify the name of database 140 and/or specify no views 147 to be reviewed. When processing module 130 receives request 150, processing module 130 may examine whether request 150 specifies the name of database 140 and/or the number of views 147 specified by request 150. If the number of views 147 specified is zero and/or if request 150 specifies the name of database 140, processing module 130 may initiate a compliance review of each view 147 of database 140. If request 150 specifies particular views 147 of database 140 to be reviewed, processing module 130 may initiate a compliance review of those specified views 147. This disclosure contemplates request 150 indicating whether it is a database level request or a view level request in any appropriate manner.

Processing module 130 may execute a macro 160 to determine the noncompliant views 147 of database 140. If request 150 was a database level request, processing module 130 may execute macro 160 to determine whether each view 147 of database 140 is compliant. If request 150 is a view level request, processing module 130 may execute macro 160 to determine whether each view 147 specified by request 150 is compliant.

To determine whether a view 147 of database 140 is compliant, processing module 130 may determine whether any of the columns of tables 145 associated with the view 147 are associated with any privacy indicators. If so, the columns associated with privacy indicators should be masked. Processing module 130 may then determine whether the view 147 masks these columns. If the view 147 does not mask one of more of these columns, processing module 130 may determine that the view 147 is noncompliant.

Even though the processing module 130 may determine that a view 147 is noncompliant, processing module 130 may further determine that the noncompliance may be excluded and/or ignored based on exclusion indicators in database 140. Each exclusion indicator may be associated with a view 147. When processing module 130 determines that the view 147 is associated with an exclusion indicator, processing module 130 may ignore and/or exclude the noncompliance of the view 147. As an example, a particular view 147 may be associated with a group of auditors. The auditors should be allowed to see certain types of information that are deemed confidential, private, and/or sensitive such as income. If a column of a table 145 contains income information and is therefore associated with a privacy indicator indicating that views 147 should mask that column, processing module 130 may exclude and/or ignore the fact that the view 147 associated with the auditors does not mask the column of income information.

After processing module 130 has completed the compliance review, processing module 130 may generate a report 170 that contains the results of the review. Report 170 may include the names of the views 147 that were reviewed, whether each view 147 is compliant, noncompliant, and/or excluded, and/or any other suitable information associated with views 147. Processing module 130 may communicate report 170 to device 114. User 112 may then use device 114 to view report 170. In this manner, user 112 may be informed of the views 147 of database 140 that are noncompliant.

In particular embodiments, system 100 may enhance database compliance by automating the process of reviewing view compliance. System 100 may also reduce the amount of network traffic caused by compliance reviews. Specifically, system 100 allows user 112 to review each view 147 of database 140 collectively rather than individually thus reducing the amount of traffic over network 120.

In operation, system 100 may determine the views 147 of database 140 that are noncompliant and inform user 112 of these views 147. User 112 may be an administrator of database 140 who reviews the compliance of views 147 of database 140. User 112 may use device 114 to communicate a request 150 to processing module 130 to request that processing module 130 review the compliance of views 147 of database 140. If request 150 is a database level request, processing module 130 may review the compliance of each view 147 of database 140. If request 150 is a view level request, processing module 130 may review the compliance of the particular views 147 of database 140 specified by request 150. Processing module 130 may determine whether request 150 is a database level request or a view level request and execute the appropriate macro 160. Macro 160 may allow processing module 130 to determine the compliance of views 147 of database 140.

For each view 147, processing module 130 may determine the columns and/or tables 145 associated with the view 147. Processing module 130 may then determine whether these columns and/or tables 145 are associated with privacy indicators. If a column is associated with a privacy indicator, processing module 130 may determine that the information in the column should be masked. Processing module 130 may then determine whether the view 147 masks the columns associated with a privacy indicator. If the view 147 fails to mask one or more of these columns, processing module 130 may determine that the view 147 is noncompliant.

For example, a view 147 may be associated with columns of a table 145 that contain the names and contact information of various individuals. The contact information column may be associated with a privacy indicator indicating that the contact information should be masked. The view 147 may not be configured to mask the contact information. When processing module 130 reviews the views 147 of database 140, processing module 130 may determine that the view 147 is noncompliant because it does not mask the contact information that is associated with a privacy indicator.

Processing module 130 may ignore and/or exclude the noncompliance of particular views 147. These views 147 are associated with an exclusion indicator. Processing module 130 may determine that based on the exclusion indicator the noncompliance of the view 147 associated with the exclusion indicator may be excluded or ignored. Using the previous example, the view 147 may be associated with auditors and as a result, the view 147 may be associated with an exclusion indicator because the auditors should be allowed to view the contact information in table 145. Even though processing module 130 determines that the view 147 is noncompliant because it does not mask the contact information, processing module 130 may ignore and/or exclude the noncompliance based on the exclusion indicator associated with the view 147.

After finishing the compliance review, processing module 130 may generate a report 170 that contains the results of the compliance review. The report 170 may indicate the views 147 that were compliant and the views 147 that were not compliant. The report 170 may also indicate the views 147 that were excluded based on exclusion indicators. Processing module 130 may format the results of the compliance review for report 170. For example, processing module 130 may format the results to be appropriate for an Excel spreadsheet. After generating report 170, processing module 130 may communicate report 170 to device 114. User 112 may then use device 114 to view report 170 and the results of the compliance review.

In this manner, system 100 may enhance the compliance of database 140 by automating the process of reviewing compliance. System 100 may also reduce the amount of network traffic caused by compliance reviews by allowing the views 147 of database 140 to be reviewed collectively rather than individually.

Figure 2:
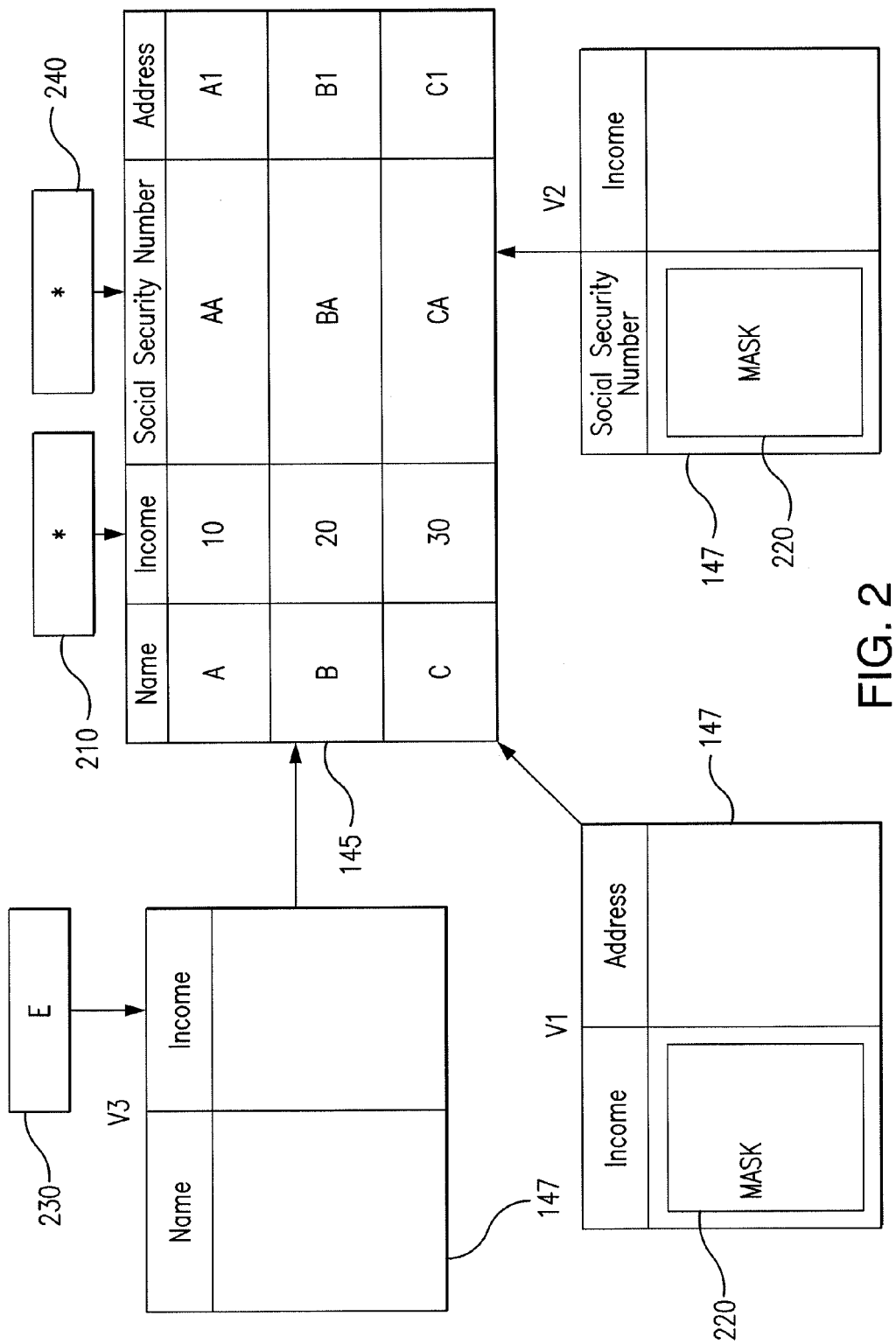
FIG. 2 illustrates a database of the system of FIG. 1.
Figure 3:
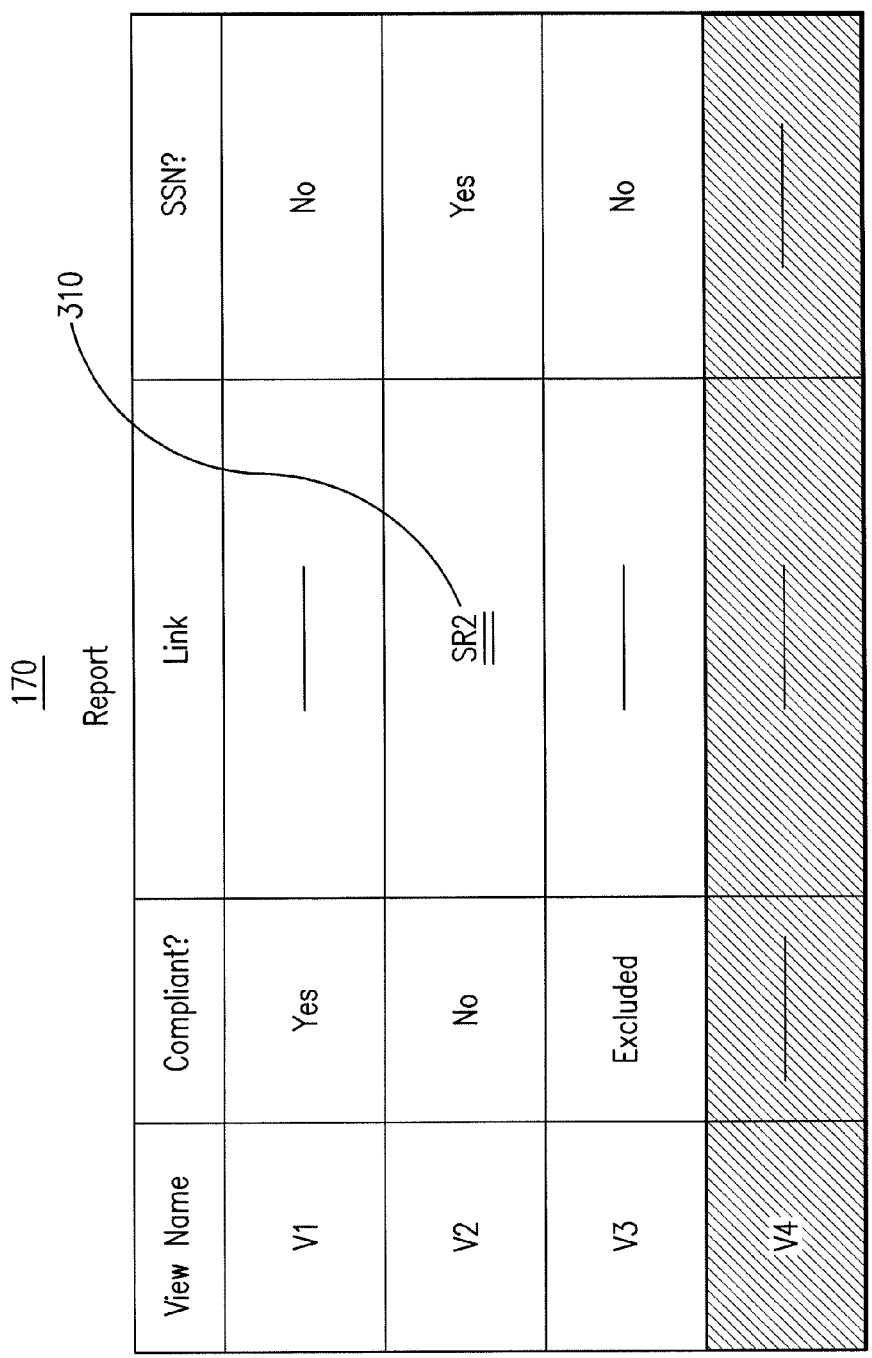
FIG. 3 illustrates a report of the system of FIG. 1.

FIGS. 2 through 4 illustrate examples of particular elements of system 100. FIG. 2 illustrates the setup of an example database 140. FIG. 3 illustrates an example report 170. FIG. 4 illustrates an example sub-report 400 of report 170.

FIG. 2 illustrates a database 140 of the system 100 of FIG. 1. As provided by FIG. 2, database 140 may store a table 145 and views 147 associated with table 145. Views 147 may be used to access information stored in table 145. In the illustrated example, database 140 stores one table 145 and three views 147: V1, V2, and V3. However, it is understood that database 140 may store any suitable number of tables 145 and any suitable number of views 147.

Database 140 may store tables 145. Each table 145 may include columns of information. As an example, database 140 may store a table 145 with three columns. The first column may store the names of individuals, the second column may store the incomes of these individuals, the third column may store the social security numbers of these individuals, and the fourth column may store the addresses of these individuals.

Particular columns of table 145 may be associated with a privacy indicator 210. Privacy indicator 210 may indicate that the information in the associated column may be confidential, private, and/or sensitive. As a result, the information in the column should be masked. As an example, the income of an individual may be considered private information. As a result, a column containing income information may be associated with privacy indicator 210 indicating that income should be masked. This disclosure contemplates columns of table 145 being associated with any appropriate indicator indicating that the column should be masked. This disclosure further contemplates view 147 masking a column of table 145 for any appropriate reason.

Certain columns of table 145 may be associated with a social security indicator 240 indicating that the column contains social security numbers. In the illustrated example, the column of social security numbers is associated with social security indicator 240. Various components of system 100 may use social security indicator 240 to determine whether a column of table 145 includes social security numbers, whether the column should be masked, and/or given different treatment in a report 170.

Database 140 may store views 147. Each view 147 may be associated with a table 145. Views 147 may be used to access information stored within their associated tables 145. In the illustrated example of FIG. 2, three views 147 are associated with table 145: V1, V2, and V3. V1 may be used to access the income and address columns of table 145, V2 may be used to access the social security numbers and income columns of table 145, and V3 may be used to access the name and income columns of table 145.

Views 147 may be configured to mask information. If information is masked, then that information will not be visible to a user associated with the view 147. In the illustrated example of FIGS. 2, V1 and V2 have been configured with masks 220. V1 has been configured to mask income and V2 has been configured to mask social security numbers. If a user uses V1 to access information in table 145, then the user will not be able to see incomes. Likewise, if the user uses V2 to access information in table 145, then the user will not be able to see social security numbers.

In some instances, views 147 may be configured incorrectly and information that should be masked remain unmasked. In the illustrated example of FIG. 2, the income and social security number columns of table 145 are associated with privacy indicator 210 and social security indicator 240 respectively, indicating that information in these two columns should be masked. V2 accesses both the social security number and income columns of table 145. However, V2 is configured to mask the social security numbers but not the incomes. As a result, V2 may be configured incorrectly and therefore, processing module 130 may determine that V2 is noncompliant.

Certain views 147 may be associated with an exclusion indicator 230. Exclusion indicator 230 may indicate that the noncompliance of the associated view 147 may be excluded or ignored. In the illustrated example of FIG. 2, V3 is associated with exclusion indicator 230. V3 does not mask information in the income column of table 145 even though the income column is associated with privacy indicator 210. As a result, V3 may be noncompliant. However, because V3 is associated with exclusion indicator 230 the noncompliance of V3 may be excluded and/or ignored during a compliance review. Processing module 130 may perform a compliance review on database 140 of the illustrated example of FIG. 2. Processing module 130 may determine that V1 is compliant, V2 is noncompliant, and V3 is excluded. After processing module 130 makes its determinations, processing module 130 may generate a report 170 containing the results of the review.

FIG. 3 illustrates a report 170 of the system 100 of FIG. 1. Processing module 130 may generate report 170 after processing module 130 finishes a compliance review. Report 170 may contain information about the views 147 that processing module 130 reviewed during the compliance review. Processing module 130 may further communicate report 170 to device 114 of user 112 so that user 112 may see the results of the compliance review by viewing report 170 on device 114. User 112 may view report 170 on a display of device 114. Device 114 may execute application 116 to receive report 170 and to present report 170 on a display of device 114.

Report 170 may indicate the names of the views 147 that were reviewed during the compliance review. In the illustrated example of FIG. 3, report 170 indicates that V1, V2, and V3 were reviewed during the compliance review. Report 170 may further indicate whether these views were compliant, noncompliant, and/or excluded. In the illustrated example of FIG. 3, V1 is compliant, V2 is noncompliant, and V3 is excluded. V1 may be compliant because the columns associated with V1 that should be masked are masked. V2 may be noncompliant because one or more columns associated with V2 that should be masked are not masked. V3 may be excluded because V3 is associated with exclusion indicator 230.

Processing module 130 may generate sub-reports for views 147 that are noncompliant. Processing module 130 may include links 310 to the sub-reports in report 170. In the illustrated example of FIG. 3, V2 is noncompliant and report 170 includes a link 310 to a sub-report associated with V2. When user 112 activates link 310 by clicking and/or by performing any appropriate method, user 112 may view the sub-report associated with V2. An example sub-report will be discussed further as part of the discussion of FIG. 4.

Report 170 may indicate whether views 147 include social security numbers. Processing module 130 may determine whether a particular view 147 includes social security numbers by determining whether the view 147 accesses a column that is associated with social security indicator 240. In the illustrated example of FIG. 3, report 170 contains a column that indicates whether V1, V2, and/or V3 include social security numbers. V1 and V3 do not include social security numbers, but V2 does. By viewing report 170, user 112 may determine which views 147 are compliant and which views 147 should be given special treatment because the view 147 includes social security numbers.

Report 170 may also indicate views 147 that do not exist. Report 170 may indicate that a view 147 does not exist when processing module 130 receives a request 150 that is a view level request. Request 150 may then request a compliance review of a view 147 specified in request 150 that does not exist. As a result, report 170 may indicate that a requested view 147 does not exist. In the illustrated example of FIG. 3, report 170 indicates that V4 does not exist by highlighting and/or shading a row corresponding to v4. This disclosure contemplates report 170 indicating a view 147 does not exist in any appropriate manner.

FIG. 4 illustrates a sub-report of the report 170 of the system 100 of FIG. 1. Processing module 130 may generate a sub-report when processing module 130 determines that a view 147 is compliant or noncompliant. The sub-report may indicate to user 112 the reasons that a particular view 147 is compliant or noncompliant.

In the illustrated example of FIG. 4, a sub-report for V2 has been provided. User 112 may have accessed the V2 sub-report by clicking link 310 in report 170. The V2 sub-report indicates that V2 accessed the columns social security number and income. The sub-report further indicates that both these columns are private and therefore should be masked. Processing module 130 may have determined that these columns are private based on their association with privacy indicators 210 and/or social security indicators 240. The V2 sub-report further indicates that the social security number column was masked but the income column was not masked. Because the income column was not masked when it should have been masked, V2 is noncompliant. By viewing the sub-report, user 112 may gain a better understanding of why a particular view 147 is compliant, noncompliant, and/or excluded.

Noncompliant views 147 may be may be remedied by configuring such views 147 to mask columns that should be masked. In particular embodiments, processing module 130 may remedy noncompliant views 147. For example, processing module 130 may execute a second macro 160 that configures noncompliant views 147 in database 140 once the noncompliant views 147 have been determined. In some embodiments, processing module 130 may alert an administrator of the noncompliant views 147 in database 140, and the administrator may configure these views 147 to mask the columns that should be masked.

Figure 5:
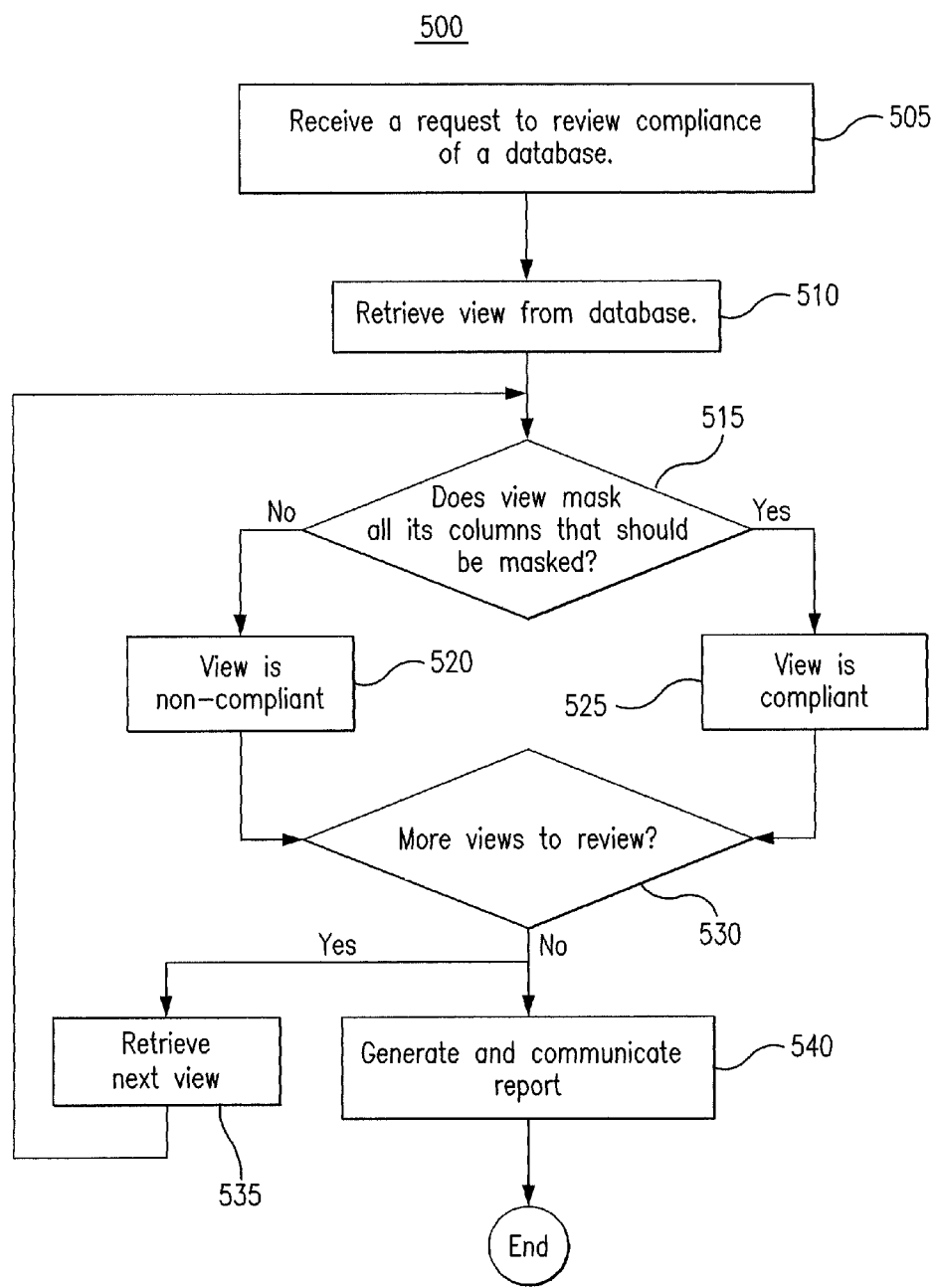
FIG. 5 is a flowchart illustrating a method of reviewing view compliance.

FIG. 5 is a flowchart illustrating a method 500 of reviewing view compliance. In particular embodiments, processing module 130 may perform method 500. By performing method 500, processing module 130 may enhance database compliance by automating the process of reviewing view compliance. Processing module 130 may also reduce the amount of network traffic caused by view compliance reviews by performing method 500.

Processing module 130 may begin by receiving a request to review compliance of a database in step 505. The request may be a database level request or a view level request. If the request is a database level request, processing module 130 may review the compliance of each view in the database. If the request is a view level request, processing module 130 may review the particular views specified by request 150.

In step 510, processing module 130 may retrieve a view from the database. Processing module 130 may then determine whether the view masks all columns that should be masked in step 515. The columns that should be masked may be associated with privacy indicators and/or social security indicators. Processing module 130 may identify these columns and then determine whether the view masks these columns. If one or more of these columns are not masked by the view, processing module 130 may determine the view is noncompliant and mark the view appropriately in step 520. If all these columns are masked, processing module 130 may determine that the view is compliant and mark it appropriately in step 525. Processing module 130 may then continue to step 530 to determine if there are more views to be reviewed. If there is another view to review, processing module 130 may continue to step 535 and retrieve the next view. Processing module 130 may then return to step 515 to review the next view.

If there are no more views to review, processing module 130 may continue to step 540 to generate and communicate a report. The report may indicate which views are compliant and which views are noncompliant. Processing module 130 may communicate the report to a requesting user so that the user can determine whether the database is compliant and if not which views of the database are noncompliant. In this manner, processing module 130 may enhance database compliance by automating the compliance review process.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a network interface operable to communicate with a database comprising:
a plurality of columns; and
a plurality of views, wherein each view is associated with at least one column of the plurality of columns; and
a processor communicatively coupled to the network interface and operable to:
receive a request to determine one or more noncompliant views of the database;
receive a second request to determine whether a second view of the database is noncompliant;
in response to receiving the request, for each view of the plurality of views:
for each column associated with the view, determine whether the column is associated with a privacy indicator that indicates that the column should be masked;
for each column associated with the view, determine whether the view masks the column; and
determine that the view is noncompliant if the view does not mask at least one column associated with the view, wherein the at least one column is further associated with at least one privacy indicator that indicates that the at least one column should be masked;
determine, in response to receiving the second request, that the second view does not exist within the database;
generate a report that indicates whether each view of the database is noncompliant, wherein the network interface is further operable to communicate the report to a sender of the request;
wherein the report comprises for each view of the database that is determined to be noncompliant, a subreport comprising a description of the at least one column associated with the view, and a link corresponding to the subreport; and
generate a second report that indicates that the second view does not exist in the database, wherein:
the second report highlights a description associated with the second view to indicate that the second view does not exist within the database; and
the network interface is further operable to communicate the second report to a sender of the second request;
wherein in response to the request, for each view of the database, the processor is further operable to determine, based on an exclusion indicator associated with the view, whether the view is an excluded view, wherein the excluded view is not required to mask columns associated with privacy indicators that indicate that the columns should be masked, and the report indicates each view of the database that is an excluded view.

2. The apparatus of claim 1, wherein the processor is further operable to determine whether the request is a request to determine one or more noncompliant views of the database or a request to determine whether a view of the database is noncompliant.

3. The apparatus of claim 1, wherein the processor is further operable to:
in response to receiving the second request, for each column associated with the second view:
determine whether the second view masks the column; and
determine whether the column is associated with a privacy indicator that indicates that the column should be masked;
determine that the second view is noncompliant if the second view does not mask at least one column associated with the second view, wherein the at least one column is further associated with at least one privacy indicator that indicates that the at least one column should be masked; and
generate a second report that indicates whether the second view is noncompliant, wherein the network interface is further operable to communicate the second report to a sender of the second request.

4. The apparatus of claim 1, wherein:
the processor is further operable to determine for each view of the database, in response to the request, whether the view is associated with a column corresponding to a social security number; and
the report indicates each view of the database that is determined to correspond to a social security number.

5. An apparatus comprising:
a memory operable to store instructions; and
a processor communicatively coupled to the memory and, when the instructions are executed, operable to:
communicate a request to determine one or more noncompliant views of a database, wherein the database comprises:
a plurality of columns, wherein each column is associated with a privacy indicator; and
a plurality of views, wherein each view is associated with at least one column of the plurality of columns;
receive, in response to the request, a report that indicates whether each view of the database is noncompliant, wherein:
for each column associated with the view, whether there is a privacy indicator associated with the view that indicates that the view should be masked is determined;
for each column associated with the view, whether the view masks the column is determined; and
a view is noncompliant if the view does not mask at least one column associated with the view, wherein the at least one column is further associated with at least one privacy indicator that indicates the at least one column should be masked;
communicate a second request to determine whether a second view of the database is noncompliant;
in response to the second request, receive a second report that the second view does not exist within the database, wherein the second report highlights a description associated with the second view to indicate that the second view does not exist within the database;

wherein the report comprises for each view of the database that is determined to be noncompliant, a subreport comprising a description of the at least one column associated with the view, and a link corresponding to the subreport; and wherein in response to the request, for each view of the database, whether the view is an excluded view is determined based on an exclusion indicator associated with the view, wherein the excluded view is not required to mask columns associated with privacy indicators that indicate that the columns should be masked, and the report indicates each view of the database that is an excluded view.

6. The apparatus of claim 5, wherein whether the request is a request to determine one or more noncompliant views of the database or a request to determine whether a view of the database is noncompliant is determined.

7. The apparatus of claim 5, wherein the processor is further operable to:
in response to the second request, receive a second report that indicates whether the second view is noncompliant, wherein:
for each column associated with the second view:
whether the second view masks the column is determined; and
whether the column is associated with a privacy indicator that indicates that the column should be masked is determined; and
the second view is noncompliant if the second view does not mask at least one column associated with the second view, wherein the at least one column is further associated with at least one privacy indicator that indicates that the at least one column should be masked.

8. The apparatus of claim 5, wherein:
for each view of the database, in response to the request, whether the view is associated with a column corresponding to a social security number is determined; and
the report indicates each view of the database that is determined to correspond to a social security number.

9. A method comprising:
receiving a request to determine one or more noncompliant views of a database comprising:
a plurality of columns; and
a plurality of views, wherein each view is associated with at least one column of the plurality of columns;
in response to receiving the request, for each view of the plurality of views:
determining, by a processor, for each column associated with the view, whether the column is associated with a privacy indicator that indicates that the column should be masked;
determining, by the processor, for each column associated with the view, whether the view masks the column; and
determining, by the processor, that the view is noncompliant if the view does not mask at least one column associated with the view, wherein the at least one column is further associated with at least one privacy indicator that indicates that the at least one column should be masked;

generating, by the processor, a report that indicates whether each view of the database is noncompliant;

communicating, by a network interface, the report to a sender of the request;

receiving a second request to determine whether a second view of the database is noncompliant;

determining, by the processor, in response to receiving the second request, that the second view does not exist within the database;

generating, by the processor, a second report that indicates that the second view does not exist in the database, wherein the second report highlights a description associated with the second view to indicate that the second view does not exist within the database; and communicating, by the network interface, the second report to a sender of the second request;

wherein the report comprises for each view of the database that is determined to be noncompliant, a subreport comprising a description of the at least one column associated with the view, and a link corresponding to the subreport; and determining, by the processor, in response to the request, for each view of the database, based on an exclusion indicator associated with the view, whether the view is an excluded view, wherein the excluded view is not required to mask columns associated with privacy indicators that indicate that the columns should be masked, and the report indicates each view of the database that is an excluded view.

10. The method of claim 9, further comprising determining, by the processor, whether the request is a request to determine one or more noncompliant views of the database or a request to determine whether a view of the database is noncompliant.

11. The method of claim 9, further comprising:
in response to receiving the second request, for each column associated with the second view:
determining, by the processor, whether the second view masks the column; and
determining, by the processor, whether the column is associated with a privacy indicator that indicates that the column should be masked;
determining, by the processor, that the second view is noncompliant if the second view does not mask at least one column associated with the second view, wherein the at least one column is further associated with at least one privacy indicator that indicates that the at least one column should be masked;
generating, by the processor, a second report that indicates whether the second view is noncompliant; and
communicating, by the network interface, the second report to a sender of the second request.

12. The method of claim 9, further comprising determining, by the processor, for each view of the database, in response to the request, whether the view is associated with a column corresponding to a social security number, wherein the report indicates each view of the database that is determined to correspond to a social security number.

* * * * *